(12) United States Patent
Howard

(10) Patent No.: US 11,378,355 B1
(45) Date of Patent: Jul. 5, 2022

(54) SYSTEM FOR PROVIDING A THIRD-PARTY NOTIFICATION OF WEAPON DANGER

(71) Applicant: Gabriel Howard, Phoenix, AZ (US)

(72) Inventor: Gabriel Howard, Phoenix, AZ (US)

( * ) Notice: Subject to any disclaimer, the term of this patent is extended or adjusted under 35 U.S.C. 154(b) by 369 days.

(21) Appl. No.: 16/731,566

(22) Filed: Dec. 31, 2019

Related U.S. Application Data

(60) Provisional application No. 62/787,016, filed on Dec. 31, 2018.

(51) Int. Cl.
| | |
|---|---|
| *A45C 15/00* | (2006.01) |
| *F41C 33/02* | (2006.01) |
| *G01V 3/08* | (2006.01) |
| *G01V 1/28* | (2006.01) |
| *G08B 25/10* | (2006.01) |
| *G08B 29/18* | (2006.01) |
| *G08B 5/36* | (2006.01) |
| *H04B 1/02* | (2006.01) |
| *G01S 19/42* | (2010.01) |

(52) U.S. Cl.
CPC ............ *F41C 33/029* (2013.01); *G01V 1/288* (2013.01); *G01V 3/081* (2013.01); *G08B 5/36* (2013.01); *G08B 25/10* (2013.01); *G08B 29/185* (2013.01); *H04B 1/02* (2013.01); *G01S 19/42* (2013.01)

(58) Field of Classification Search
CPC ....... F41C 33/029; G01V 1/288; G01V 3/081; G08B 5/36; G08B 25/10; G08B 29/185; H04B 1/02; G01S 19/42
USPC ............ 224/576; 340/539.1, 539.11, 539.13, 340/573.1
See application file for complete search history.

(56) References Cited

U.S. PATENT DOCUMENTS

| | | | |
|---|---|---|---|
| 10,764,542 B2 * | 9/2020 | Stewart | .................. H04N 7/185 |
| 2007/0257987 A1 | 11/2007 | Wang | |
| 2014/0162584 A1 | 6/2014 | Cope | |
| 2015/0256990 A1 | 9/2015 | Vilrokx et al. | |

(Continued)

FOREIGN PATENT DOCUMENTS

WO    2018039389 A1    3/2018

OTHER PUBLICATIONS

"Concealed Carry Handgusn—Manual Safety or No Safety?" http://aliengearholsters.com/blog/smart-gun-technology-for-concealed-carry/, Dec. 26, 2019.

(Continued)

*Primary Examiner* — Tai T Nguyen
(74) *Attorney, Agent, or Firm* — Booth Udall Fuller, PLC

(57) ABSTRACT

A smart holster system may provide notifications of weapon danger, and may include a holster body with a first sensor. The first sensor may detect removal of the weapon from the holster body and indicate the weapon has been drawn. A second sensor coupled to the holster body may detect a gunshot. An indicator panel may include first, second, and third indicators. The first indicator may activate when the weapon has been drawn or the gunshot has been detected. The second indicator may activate after the weapon has been drawn and until the gunshot is detected or a predetermined amount of time elapses. The third indicator may activate after the gunshot is detected or the predetermined amount of time elapses after the weapon has been drawn. A transmitter may notify a Public Safety Access Point (PSAP) without entering a phone number in response to the third indicator being activated.

20 Claims, 4 Drawing Sheets

(56) References Cited

U.S. PATENT DOCUMENTS

| | | |
|---|---|---|
| 2015/0369559 A1* | 12/2015 | Del Rosario .......... G08C 19/12 340/686.4 |
| 2016/0072540 A1 | 3/2016 | Davis et al. |
| 2017/0061781 A1 | 3/2017 | Ware et al. |
| 2017/0074617 A1 | 3/2017 | Stewart et al. |
| 2018/0033288 A1 | 2/2018 | Strack |
| 2018/0100713 A1 | 4/2018 | Patches et al. |
| 2018/0106568 A1* | 4/2018 | Hedeen ..................... F41J 5/10 |
| 2018/0209761 A1 | 7/2018 | Erickson |

OTHER PUBLICATIONS

Identilock Biometric Fingerprint gun lock https://getidentilock.com/, Dec. 26, 2019.
"Will a $1 Million Smart Holster Prevent Deaths and Strengthen Gun Safety?" https://www.usacarry.com/smart-holster/, Dec. 26, 2019.
"Smart guns in police holsters" https://www.nydailynews.com/opinion/smart-guns-police-holsters-article-1.2981769, Dec. 26, 2019.
Yardarm http://www.yardarmtech.com/, Dec. 26, 2019.
"Not film directors': Richland deputies testing gun-activated body cameras" https://www.thestate.com/news/local/crime/article166309462.html, Dec. 26, 2019.

\* cited by examiner

SYSTEM FOR PROVIDING A THIRD-PARTY NOTIFICATION OF WEAPON DANGER

RELATED APPLICATIONS

This application claims the benefit of U.S. Provisional Patent Application No. 62/787,016, filed Dec. 31, 2018 titled "SMART HOLSTER SYSTEM," the entirety of the disclosure of which is hereby incorporated herein by this reference.

TECHNICAL FIELD

Aspects of this document relate generally to a smart holster system and to a method and device for providing notification of a weapon leaving a smart holster.

BACKGROUND

Apart from a firing range, the drawing of a weapon from a holster is often precipitated by a tense situation that is quickly going from bad to worse. No matter if the individual drawing the weapon is a private citizen or a security or law enforcement officer, emotions and adrenaline can be running high. In the heat of the moment, there is often little time to call for help. Additionally, decisions made after the weapon is drawn will later be picked apart, and a charged atmosphere where a weapon is drawn, and possibly used, often leads to poor recollection and conflicting accounts of what happened.

In the United States alone there are an estimated 2.2-2.5 million defensive gun uses annually. These defensive gun uses include both reported cases of deadly force being used, as well as the presence of a gun de-escalating an encounter, which may include "Good Samaritans" defending themselves legally.

SUMMARY

According to an aspect, a smart holster system configured to provide notifications of weapon danger may include a holster body configured to receive a weapon. A processor may be coupled to the holster body, the processor configured to receive, process, and send signals. A magnetic sensor may be coupled to the holster body, the magnetic sensor configured to detect removal of the weapon from the smart holster and send a first signal to the processor indicating the weapon has been drawn from the smart holster. A decibel meter may be coupled to the holster body, the decibel meter configured to detect a gunshot when sound at an intensity greater than or equal to 120 decibels is detected and to send a second signal to the processor indicating the gunshot has been detected. A recording device may be coupled to the holster body and configured to record video, audio, or both, in response to an activation signal from the processor. The processor may send the activation signal to the recording device after a predetermined amount of time elapses from the processor receiving the first signal or after the processor receives the second signal. A solid-state memory system may be coupled to the recording device and configured to store recordings from the recording device. An indicator panel may be coupled to the holster body and comprise a first indicator configured as a green light, a second indicator configured as a yellow light, and a third indicator configured as a red light. The first indicator may be configured to be activated, and the green light may be on, until the indicator panel receives an activation signal from the processor or an emergency signal from the processor. The second indicator may be configured to be activated, and the yellow light to be on, after the indicator panel receives an activation signal from the processor and until the indicator panel receives an emergency signal from the processor. The third indicator may be configured to be activated, and the red light to be on, after the indicator panel receives an emergency signal from the processor or a predetermined amount of time elapses. A transmitter may be coupled to the holster body and be configured to notify a Public Safety Access Point (PSAP) without manually entering a 10-digit phone number in response to receiving an emergency signal from the processor. The processor may be configured to send the emergency signal to the transmitter after the predetermined amount of time from receiving the first signal from the magnetic sensor, or after receiving the second signal from the decibel meter. An activation switch may be coupled to the holster body and movable to an alarm mode and a non-alarm mode, wherein upon being moved to the alarm mode the activation switch is configured to send a third signal to the processor indicating an emergency. The processor after receipt of the third signal is configured to send the emergency signal to the third indicator and the emergency signal to the transmitter. Upon being moved to the non-alarm mode, the activation switch is configured to send a fourth signal to the processor indicating a false alarm, and the processor after receipt of the fourth signal is configured to send a non-emergency signal to the indicator panel to turn off the yellow light and turn on the green light and to send a non-emergency signal to the transmitter to prevent the transmitter from notifying the PSAP.

Particular embodiments may comprise one or more of the following features. The holster body may comprise a level three weapon retention system. The weapon may comprise a sidearm, pistol, or firearm. The predetermined amount of time may comprise 10 seconds or less. Wherein the sensor detecting the weapon being drawn can detect the weapon being partially and not completely drawn. The transmitter may comprise one or more of a wireless modem, a GPS transmitter, a Bluetooth transmitter, an RFID or radio transmitter, and an induction loop transmitter.

According to another aspect of the disclosure, a smart holster system configured to provide notifications of weapon danger may include a holster body configured to receive a weapon. A processor may be coupled to the holster body, the processor being configured to receive, process, and send signals. A first sensor may be coupled to the holster body, the first sensor configured to detect removal of the weapon from the smart holster and send a first signal to the processor indicating the weapon has been drawn from the smart holster. A second sensor may be coupled to the holster body, the second sensor being configured to detect a gunshot and to send a second signal to the processor indicating the gunshot has been detected. A recording device may be coupled to the holster body and configured to record video, audio, or both, in response to an activation signal from the processor, the processor sending the activation signal to the recording device after a predetermined amount of time elapses from the processor receiving the first signal or after the processor receives the second signal. An indicator panel may comprise a first indicator, a second indicator, and a third indicator. The first indicator may be configured to be activated until the weapon has been drawn or the gunshot has been detected. A second indicator may be configured to be activated after the weapon has been drawn and until the gunshot has been detected or a predetermined amount of time elapses. A third indicator may be configured to be activated after the gunshot has been detected or the predetermined amount of time has elapsed. A transmitter may be coupled to the holster body and configured to notify a PSAP without entering a phone number in response to the third indicator being activated.

Particular embodiments may comprise an activation switch movable to an alarm mode and a non-alarm mode. Upon being moved to the alarm mode the activation switch may be configured to send a third signal to the processor indicating an emergency, and the processor after receipt of the third signal may be configured to send the emergency signal to the third indicator and the emergency signal to the transmitter. Upon being moved to the non-alarm mode, the activation switch may be configured to send a fourth signal to the processor indicating a false alarm, and the processor after receipt of the fourth signal may be configured to send a non-emergency signal to the indicator panel to turn off the second indicator and turn on the first indicator and to send a non-emergency signal to the transmitter to prevent the transmitter from notifying a PSAP. The holster body may comprise a level three weapon retention system. The weapon may comprise a sidearm, pistol, or firearm. The predetermined amount of time may comprise 10 seconds or less. The sensor detecting the weapon being drawn can detect the weapon being partially and not completely drawn. The transmitter may comprise one or more of a wireless modem, a GPS transmitter, a Bluetooth transmitter, a RFID or radio transmitter, and an induction loop transmitter.

According to another aspect of the disclosure, a smart holster system configured to provide notifications of weapon danger may include a holster body configured to receive a weapon. A first sensor may be coupled to the holster body, the first sensor configured to detect removal of the weapon from the smart holster and send a first signal indicating the weapon has been drawn from the smart holster. A second sensor may be coupled to the holster body, the second sensor configured to detect a predetermined audio signature and to send a second signal indicating the predetermined audio signature has been detected. An indicator panel may comprise a first indicator, a second indicator, and a third indicator. The first indicator may be configured to be activated until the weapon has been drawn or the predetermined audio signature has been detected. The second indicator may be configured to be activated after the weapon has been drawn and until the predetermined audio signature is detected or a predetermined amount of time elapses. A third indicator may be configured to be activated after the predetermined audio signature is detected or the predetermined amount of time elapses after the weapon has been drawn. A transmitter may be configured to notify a PSAP without entering a phone number in response to the third indicator being activated.

Particular embodiments may comprise the predetermined amount of time being 10 seconds or less. The weapon may comprise a sidearm, pistol, firearm, taser, aerosol spray container, knife, club, or night stick. A recording device may be configured to record video, audio, or both, in response to the second indicator being activated. The sensor detecting the weapon being drawn can detect the weapon being partially and not completely drawn. The transmitter may comprise one or more of a wireless modem, a GPS transmitter, a Bluetooth transmitter, a RFID or radio transmitter, and an induction loop transmitter. An activation switch movable to an alarm mode and a non-alarm mode, may, upon being moved to the alarm mode activate the third indicator, and may, upon being moved to the non-alarm mode activate the first indicator and the transmitter will not notify a PSAP based on a preceding event.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f). To the contrary, if the provisions of 35 U.S.C. § 112(f) are sought to be invoked, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The written description is made in conjunction with the appended drawings, where like designations denote like elements, and.

DETAILED DESCRIPTION

Figure 1A:
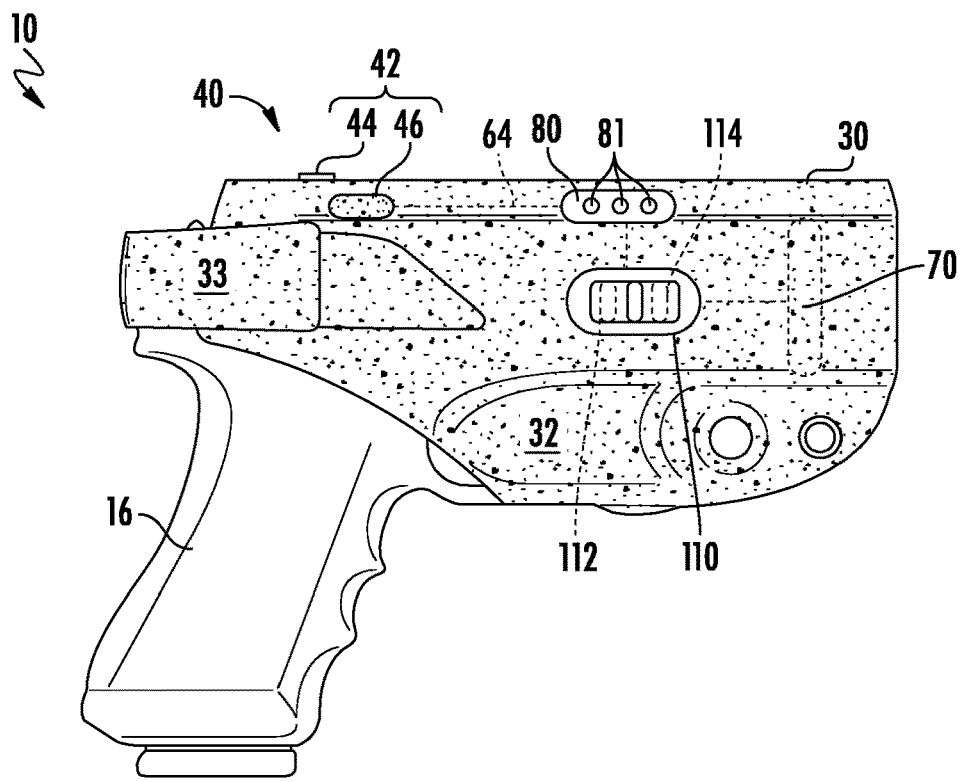
FIGS. 1A-1C depict various views of a smart holster.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise one or more of any components, models, types, materials, versions, quantities, or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Contemplated herein is a system or smart holster system 10 configured to allow a user or weapon owner 14 to use a weapon 16 and to notify a PSAP 20, such as a 9-1-1 dispatch center or law enforcement agency. PSAPs 20 are discussed in greater detail with respect to FIGS. 3A and 3B. The smart holster system 10 may also preserve a record of events leading up to and following a non-accidental weapon draw or detection of gunfire. As used herein weapon 16 may comprise a sidearm, pistol, or firearm, as well as in some instances a taser, aerosol spray container, knife, club, or night stick.

Once activated, a smart holster or holster 30 begins a recording loop that is continuously overwritten. When the weapon 16 is drawn, a timer may start. If the smart holster 30 is not deactivated before the timer expires, or if a gunshot is detected, PSAP is notified of a potentially dangerous situation unfolding. Additionally, a recording system 40 that may comprise a recording device or one or more recording devices 42 (such as a camera or video camera 44 for video recording and a microphone 46 for audio recording), begins storing media of the preceding and subsequent events, for evidentiary purposes. The storing of media (such as video and audio recordings or files) may be in a memory system 48, which comprises as a solid-state memory system that may comprise SD cards or other suitable storage.

It should be noted that while the embodiments of the smart holster 30 discussed herein are done in the context of a particular handgun holster, this system 10 may be adapted for use in other weapon retention systems, methods, and devices.

Figure 1B:
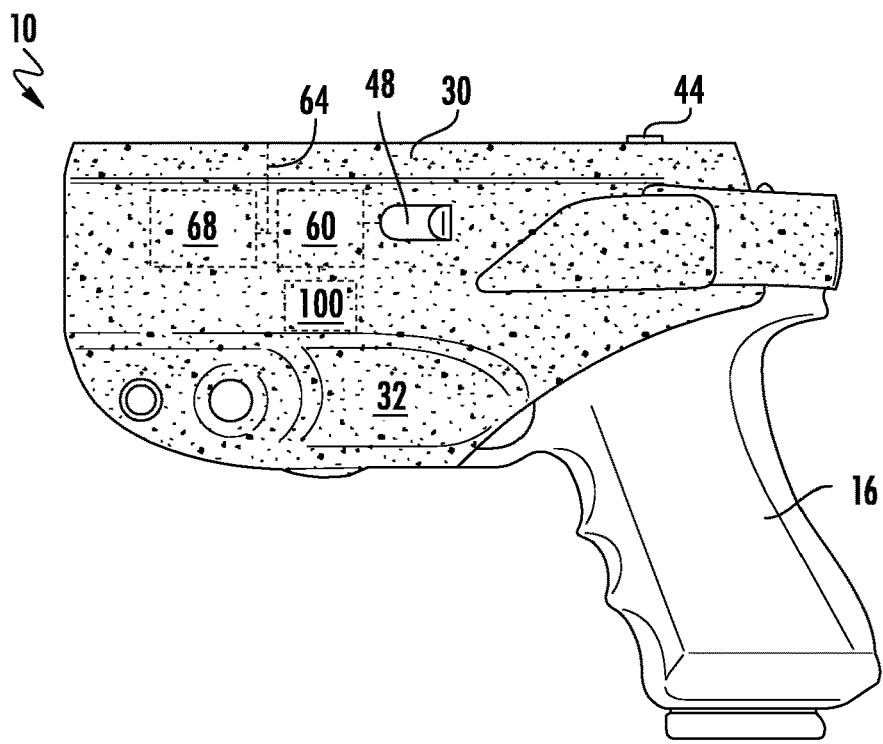
Figure 1C:
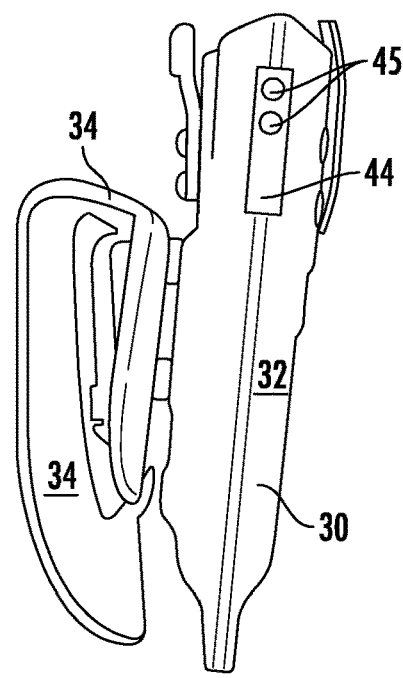

FIGS. 1A-1C show various views of a non-limiting example of a smart holster system 10. More specifically, FIG. 1A shows a right-side view of a smart holster 30. As used herein, the right side of the smart holster 30 and the holster system 10 (together with all other references to sides, positions, or orientations) corresponds to the positions, orientations, and locations of the user 14 using the system 10. As such, the right side of the holster 30 corresponds to a right side of the user 14, or the exposed outer surface of the holster 30 when worn on the right side, waist, or hip, of a user 14, with the barrel of the weapon 16 facing downward and the handle or hand stock facing backwards of the rear of the user 14. The holster 30 on the right side of the user 14 will be a common position of use, especially for right-handed users.

FIG. 1B depicts a left-side view of the smart holster 10 (opposite the right-side view of the smart holster 30 shown in FIG. 1B). While a number of particular features are shown on the right side in FIG. 1A, with other features shown are shown on the left side with FIG. 1B, in many instances, the position of many of the features may be interchangeable, or may be switched, reversed, or substituted. As shown in both FIGS. 1A and 1B the smart holster 30 may comprise at least a level three retention system with a gun clip, strap, or retention system 33 releasably coupled to the holster body 32. The smart holster 30 may include or use any holster known in the art that minimizes accidental weapon draws or misfires. In some embodiments, components of the smart holster system 10 may be incorporated into a known holster to form a smart holster 30 either at the time of manufacture, or conversely, by retrofitting the holster to be part of the smart holster system 10.

FIG. 1C shows an embodiment of a front view of the smart holster 30, with a recording device 40 or camera 44 disposed at the front of the holster body 32, with one or more lenses 45 oriented forwards, or in any other desirable directions. In some instances, multiple lenses maybe used to produce composite or 3-dimensional (3D) views or to improve a field of view. The holster body 32 may be coupled to a clip, strap, or retention system 34 so as to secure the holster body 32 to the user 14 with one or more belts or straps 37, as is known in the art.

A processor or microcontroller 60 may be coupled to, and disposed within, the holster body 32. The processor 60 may be configured to receive, process, and send signals within the smart holster system 10 to allow for interconnection and integrated functionality among various components of the system 10. The signals may be passed or sent along transmission lines, wires, cables, or conductors 64, as well as via wireless signals. For example, the processor may be coupled to a battery or power source 68 with lines 64.

The battery 68 may be rechargeable. In some embodiments, the battery 68 may be removable and replaceable, while in others the battery 68 may be permanently incorporated into the smart holster system 10, and more specifically the holster 30, which may provide a more durable and streamlined smart holster 30. As an option, the battery 68 may be charged using charging technology standards and interfaces that are readily available, such as phone or mobile device chargers, USB, or other suitable charger.

A magnetic sensor, reed sensor, weapon draw detection sensor, or first sensor 70 may be coupled to the holster body 32. The magnetic sensor or draw sensor 70 configured to detect removal of the weapon 16 from the smart holster system 10 and send a first signal to the processor 60 indicating that the weapon 16 has been drawn from the smart holster. The draw sensor may be an IR sensor, a magnetic sensor, a reed sensor, or any other suitable sensor for detecting the movement or removal of the weapon 16 from the holster 30. The draw sensor 70 may detect relative movement between the holster body 32 and the weapon 16, and may also detect when the weapon 16 is no longer in close proximity or adjacent the sensor 70. In some instances the draw sensor 70 will be positioned at a lower end or bottom of the holster body 32 (such as near where a lower end or muzzle of the weapon 16 may be positioned when holstered) so as to be a first or early position at which the weapon will not be present when being drawn, allowing the sensor 70 to detect the removal or drawing of the weapon 16 even when the weapon is only partially drawn or removed, and not completely drawn or removed, a portion of the weapon remaining in the holster body or sheath 32, as shown e.g., in FIG. 2B. The magnetic sensor 70, like each of the sensors or components of the smart holster system 10, may be disposed (entirely or partially) within the holster body 32 so as to be hidden from view, protected, and provide for a smooth or evenly contoured exterior and interior surface of the holster body 32, so as to prevent snags or catching on the holster body 32.

The draw sensor 70 may comprise one or more sensors 70 to detect when the weapon 16 is present in the holster 30, and when the weapon 16 has been drawn. The sensors 70 may operate in a variety of ways, including but not limited to detection of a deformation in the shape of the holster body 32 (e.g. side pushed out by the presence of a gun, etc.), direct contact between the holster body 32 the weapon 16 (e.g. conduction or capacitance detection, etc.), movement of a switch (e.g. actuation of a retention clip, magnetic sensor, etc.), and the like.

In some embodiments, the system 10 may be triggered by the weapon 16 being removed from the holster 30. In other embodiments, the system 10 may be triggered when the holster 30 is put into a condition for the weapon 16 to be drawn (e.g. gun retention strap 33 is unfastened, etc.). As an option, the system 10 may be put into an intermediate mode (e.g. the second indicator 84 being activated) upon detection of the holster being readied for a weapon draw, or the processor 60 sending an activation signal or an emergency signal. For example, the unfastening of the gun retention strap 33 may put the recording system 40 in capture mode, but will not notify the PSAP 20 unless the weapon 16 is removed and the predetermined amount of time 90 expires, or a gunshot is detected.

A decibel meter or microphone 46 may be coupled to the holster body 32, the decibel meter 46 may be configured to detect a gunshot when sound at an intensity greater than or equal to 120 decibels is detected. When a gunshot is detected by the decibel meter 46, the decibel meter may send a second signal to the processor 60 indicating the gunshot has been detected. Stated another way, a continuous signal may be sent from the decibel meter 46 that may be recognized by the processor 60 as a gunshot. In some instances, the processor 60 may search not only for sound intensity or if sound exceeds a particular threshold, like 120 decibels, 130 decibels, or other suitable number, but may also search for a particular audio footprint, an aural fingerprint, or acoustic pattern or signature that is indicative of a gunshot or gunfire, and distinguishes from other loud sounds. A gunshot may trigger the notification of the PSAP, independent of the predetermined amount of time 90.

The decibel meter 46 be part of a larger or more extensive recording device 40. The recording device 40, may comprise the decibel meter 46 and may also comprise a camera or video camera 44, which may comprise one or more lenses 45, and be configured to record video, audio, or both. The recording device 40 may be coupled to the holster body 32. The recording device 40 may also record audio (such as with one or more microphones 46, which may be the same or different as the decibel meter or microphone 46.). In some instances, the recording device 40 may record both audio and video, which may begin, or continue, in response to an activation signal from the processor. After the recording device 40 receives an activation signal from the processor 60, the recording device 40 can continue recording from a continuous recording loop of previously recorded material without recording over or loosing previously recorded material. The previously recorded material may extend back in time for a desirable period of time of for an amount of time of the recording loop, such as a previous 5 minutes, 10 minutes, half-hour, hour, or more. Moving forward, additional material can be recorded and preserved after the processor 60 sends the activation signal to the recording device 40 after a predetermined amount of time 90 elapses from the processor 60 receiving the first signal or after the processor 60 receives the second signal. The predetermined amount of time 90 may be less than or equal to 15 seconds, 10 seconds, 8, seconds, or 5 seconds, so as to be short enough to timely connect with a PSAP 20 when danger is present, and also short enough so as to prevent a false alarm and premature connection with the PSAP 20.

The recording device 40 can store material, recordings, or footage to memory system, solid state memory, or SD cards. The memory system 48 is coupled to the recording device 40 and configured to store recordings from the recording device. The memory system 48 may be physically integrated with the holster body 32, and include an opening for receiving removable storages, such as SD cards. The memory system 48 may also be coupled to the processor 60, such as by lines 64. In some embodiments, the solid-state memory 48 may be permanently incorporated into the smart holster system 10, and may require special equipment or authentication to be accessed or erased. This may be advantageous from an evidentiary standpoint, preventing claims of tampering or accidental spoliation.

In some embodiments, the smart holster system 10 may also interact with external recording systems. For example, in one embodiment, the triggering of the system's internal capture (e.g. ceasing overwriting) may also trigger other devices (e.g. body cams, car mounted cameras, security cameras, etc.) to do the same. Alternatively, the smart holster system 10 may operate independently of body cams and other equipment used by law enforcement, providing a self-contained system for an individual unaffiliated with law-enforcement or other similar institution. Additionally, in some embodiments, elevating the smart holster recording system to capture mode may modify the nature of the media subsequently captured (e.g. increase video resolution or audio bit rate, etc.). Pre-activation, the recording system may make use of reduced capture settings to extend battery life, and then switch to maximized settings upon escalation.

An indicator panel 80 is coupled to, and in some instances physically integrated with, the holster body 30. The indicator panel 80 may comprise at least one indicator 81, and in some instances, three indicators 81, such as a first indicator 82, a second indicator 84, and a third indicator 86, examples of which are shown, e.g., in FIG. 1A, and FIGS. 2A-2D. However, any desired number of indicators 81 may be used. The indicators 81 of the indicator panel 80 may be visual (such as lights), auditory (such as sounds), or tactile or haptic (such as vibrations). When multiple indicators 81 are visual, such as different colors of light, separate light emitters, modules, sources, or indicators may each emit, produce, or show different colors of light, as described and shown herein. On the other hand, for visual indicators such as different colors of light, a single or unitary light emitter, module, source, or indicator may each emit, produce, or show any number of different colors of light or produce multiple indications at different times. In other words, a single indicator 81 may change from red to yellow to green to indicate three different stages, levels of alarm, or indications.

FIG. 1A and FIGS. 2A-2D depict an instance in which a first indicator is configured as a green light 82, a second indicator is configured as a yellow light 84, and a third indicator is configured as a red light 86. The first indicator 82 may be configured to be activated and the green light to be on until the indicator panel 80 receives an activation signal from the processor 60 or an emergency signal from the processor 60. The second indicator 84 may be configured to be activated and the yellow light to be on after the indicator panel 80 receives an activation signal from the processor 60 and until the indicator panel 80 receives an emergency signal from the processor 60. The third indicator 86 may be configured to be activated and the red light to be on after the indicator panel 80 receives an emergency signal from the processor 60 or a predetermined amount of time 90 elapses.

The indicator panel 80, when transmitting or communicating with optical signals, such as lights, may advantageously be positioned on the outside of the holster 30, or at a part of the holster that is oriented away from the user. For a right-handed user 14, the indicator panel 80 may be positioned on the right side of the holster 30, opposite the left side of the holster 30 that will be adjacent the person of the user 14 when worn unconcealed and at the waist. Similarly, for a left-handed user 14, the indicator panel 80 may be positioned on the left side of the holster 30, opposite the right side of the holster 30 that will be adjacent the person of the user 14 when worn unconcealed and at the waist. In other instances, a position of the indicator panel 80 may be at a front or rear of the holster 30, or at any location that provides for convenient access for the user 14 to determine the status of the smart holster 30. In yet other instances, such as when worn concealed or within a waistband, the indicator panel 80 may be positioned at the top, such as on a top of the gun clip, strap, or retention system 33. In still other instances, the indicator panel 80 may be physically separate from, and wirelessly coupled to, the holster body 30. For example, the indicator panel 80 or a portion thereof may be physically part from the holster 30, and may be integrated within a ring 87, a bracelet 88, or other wearable technology or device in the possession of the user 14. In any event, the indicator panel 80 or indicator 81 may be communicatively coupled with the smart holster 30, a portion of the indicator panel 80 being optionally physically integrated with the holster 30. In such instances, for example, a concealed weapon 16 may be retained in a smart holster 30, out of sight, and a first indicator or green light 82 may be visible on a ring 87 or bracelet 88 worn by the user 14 and visible to the user 14 while the smart holster 30 is concealed or out of sight.

A transmitter 100 is coupled to the holster body 32 and configured to notify a PSAP 20 with an emergency request 102 without manually entering a phone number, such as 10-digit phone number (area code plus the standard 7-digit number in the US), or without entering a shortened emergency number like 9-1-1. The transmitter 100 notifies the PSAP 20 in response to receiving an emergency signal from the processor 60. The processor 60 is configured to send the emergency signal to the transmitter 100 in at least two different instances. First, after the predetermined amount of time 90 elapses from the processors 60 receiving the first signal from the magnetic sensor 70. Second, after the processor 60 receives the second signal from the decibel meter 46. The transmitter 100 may comprises one or more of a wireless modem, a global positioning system (GPS) transmitter, a Bluetooth transmitter, a RFID or radio transmitter, and an induction loop transmitter, or other suitable structure for sending (and in some instances receiving) transmissions. As shown in FIG. 2D and FIG. 3B, the transmitter 100 may send a transmission or emergency request 102 to the PSAP 20, such as through, or via, signal center 104.

In some embodiments, the smart holster system 10 may be self-contained, and interface with a wireless communication network directly with a wireless modem (e.g. access cellular network or internet directly, Wi-Fi network, etc.). In other embodiments, the smart holster system 10 may connect wirelessly to a nearby phone or other communication device (e.g. radio system, etc.), and contact the police or other party through the phone or other device. In some embodiments, the smart holster system 10 may also include a GPS receiver, and may report the location of the system 10 when communicating with the PSAP. In other embodiments, a phone connected with the system 10 may provide location information when used to communicate by the smart holster system. For faster connections, the smart holster system 10 may communicate with a PSAP via a signal center 104, as shown and described with respect to FIG. 3B.

In embodiments where the smart holster system 10 is wirelessly connected to a mobile device or cell phone 96, the mobile device may be employed for activities other than communicating with law enforcement or a PSAP, including but not limited to configuring the smart holster 30 (e.g. duration of predetermined amount of time 90, sensor thresholds, battery level, etc.), streaming or viewing media from the recording system 40, updating firmware, and the like.

An activation switch or arming switch 110 coupled to the holster 30 or holster body 32 and movable to an alarm mode 112 and a non-alarm mode 114. The activation switch 110 allows the user 14 to manually place the system 10 into or out of an activated mode or emergency mode. According to various embodiments, the activation switch 110 may be low profile, to prevent accidental toggling or being caught on clothing or other objects. As an option, the switch 110 may have a cover or guard to prevent accidental operation.

Upon being moved to the alarm mode 112 the activation switch 110 is configured to send a third signal to the processor 60 indicating an emergency. The processor 60, after receipt of the third signal, is configured to send the emergency signal to the third indicator 86 and the emergency signal to the transmitter 100. The alarm mode is shown, for instance, in FIGS. 2D and 3B.

Upon being moved to the non-alarm mode 114 the activation switch 110 is configured to send a fourth signal to the processor 60 indicating a false alarm, and the processor 60 after receipt of the fourth signal is configured to send a non-emergency signal to the indicator panel 80 to turn off the second indicator or yellow light 84 and turn on the first indicator or green light 82 and to send a non-emergency signal to the transmitter 60 to prevent the transmitter from notifying the PSAP 20. The non-alarm mode or non-activated state is shown, for instance, in FIGS. 2A and 2B.

The activation switch 110, when transmitting or communicating with optical signals, such as lights, may advantageously be positioned on the outside of the holster 30, or at a part of the holster that is oriented away from the body of the user and easily accessible by a hand of the user 14. For a right-handed user 14, the activation switch 110 may be positioned on the right side of the holster 30, opposite the left side of the holster 30 that will be adjacent the person of the user 14 when worn unconcealed and at the waist. Similarly, for a left-handed user 14, the activation switch 110 may be positioned on the left side of the holster 30, opposite the right side of the holster 30 that will be adjacent the person of the user 14 when worn unconcealed and at the waist. In other instances, a position of the activation switch 110 may be at a front or rear of the holster 30, or at any location that provides for convenient access for the user 14 to determine the status of the smart holster 30. In yet other instances, such as when worn concealed or within a waistband, the activation switch 110 may be positioned at the top, such as on a top of the gun clip, strap, or retention system 33. In still other instances, the activation switch 110 may be physically separate from, and wirelessly coupled to, the holster body 30. For example, the activation switch 110 may be physically part from the holster 30, and may be integrated within a ring 87, a bracelet 88, or other wearable technology or device in the possession of the user. In any event, the activation switch 110 may be communicatively coupled with the smart holster 30, a portion of the activation switch 110 being optionally physically integrated with the holster 30. In such instances, for example, a concealed weapon 16 may be retained in a smart holster 30, out of sight, and activation switch 110 may be activated by the user 14 while the weapon 16 and the smart holster 30 is concealed or out of sight.

Some embodiments of the smart holster system 10 may be configured to automatically place the system 10 in an activate mode, independent of or in place of an activation switch 110. For example, in an embodiment, the system 10 may make a determination whether or not to go into an activated or alarm mode 112 based upon GPS coordinates (e.g. located at firing range, located at home, traveling in a vehicle, etc.), accelerometer information (e.g. filled holster is being worn, filled holster was just picked up, etc.), and the like. In some embodiments, the ability of the system 10 to make the determination as to whether or not to go into an activated or alarm mode 112 may be manually disabled, while in other instances it may be a permanent feature of the system 10, but the user still has the option to deactivate the system with activation switch 110 if triggered.

Figure 2A:
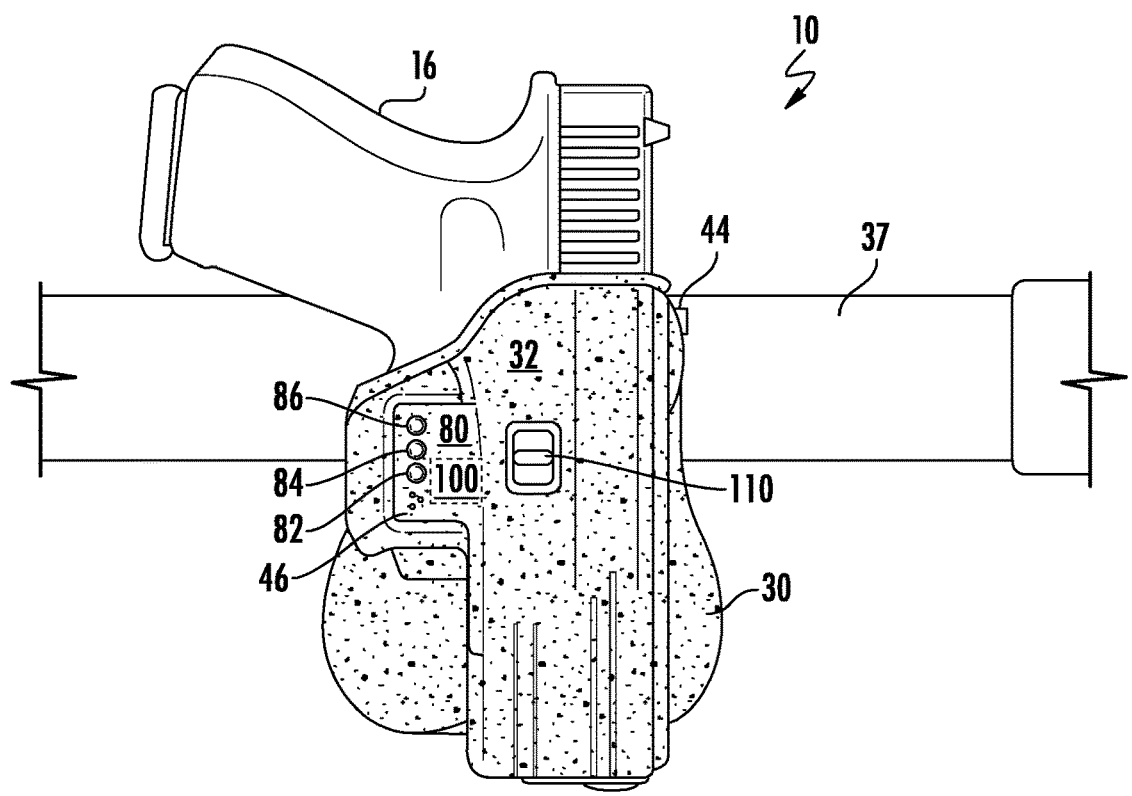
FIGS. 2A-2D depict various views of a weapon being drawn from a smart holster.
Figure 2D:
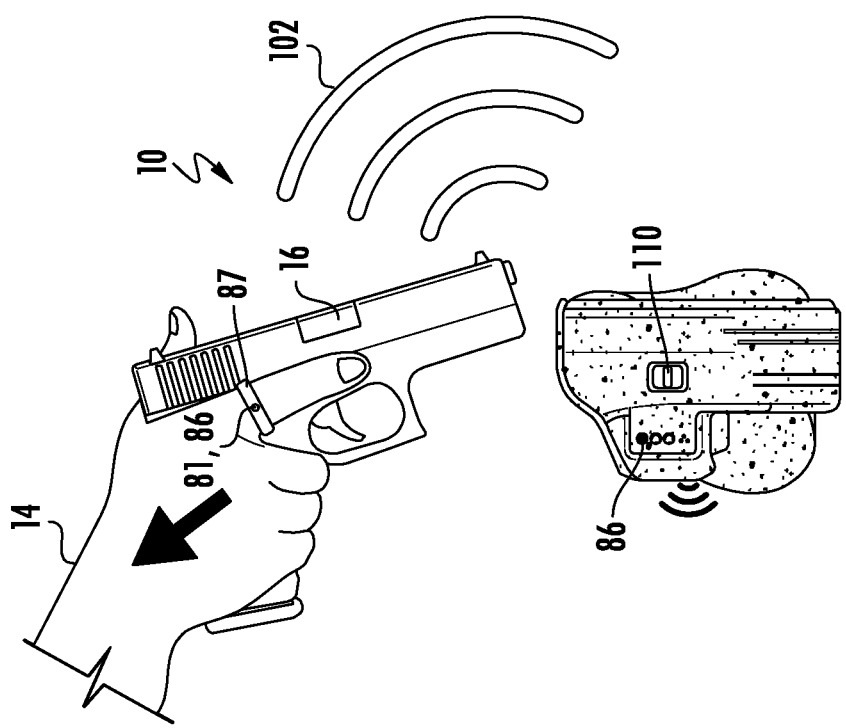

FIG. 2A shows another embodiment of a weapon 16 disposed within a smart holster 30 as part of a smart holster system 10, where like reference numbers reference like features. The holster body 32 may be coupled to a clip, strap, or retention system 34 so as to secure the holster body 32 to the user 14 with one or more belts or straps 37, for coupling the holster 30 to one or more of a belt 37, pants, around hips or waist, at shoulders or under arm, or at another desirable position as is known in the art.

Figure 2C:
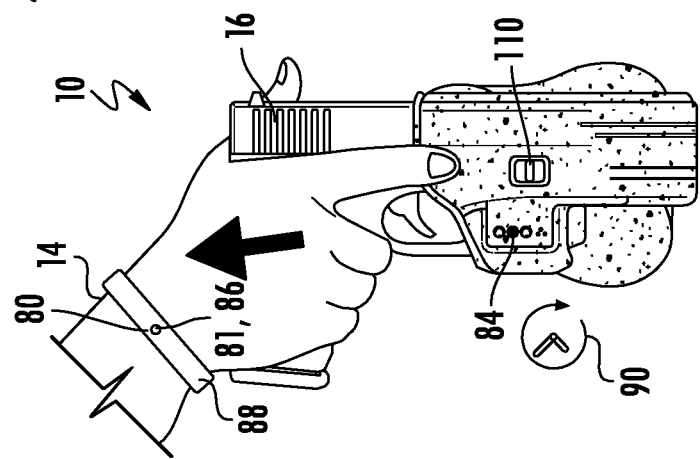
Figure 2B:
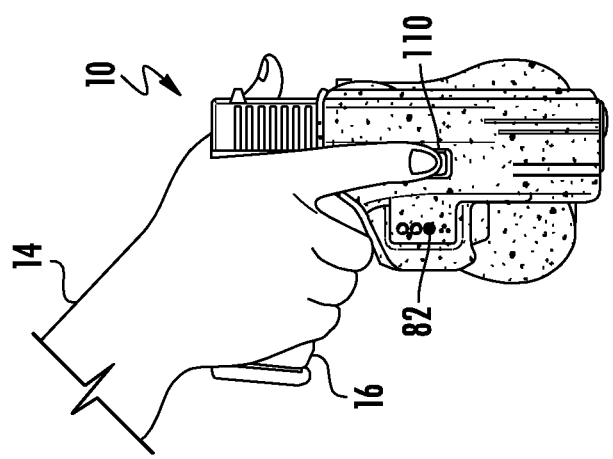

FIG. 2B, continuing from FIG. 2A, shows the user 14 with a hand on the weapon 16, and a first indicator 81 showing a green light indicating no danger or system activation. FIG. 2B also shows that the user 14 may toggle or engage the activation switch 110 from an alarm mode 112, or a neutral position, to a non-alarm mode 114, stopping any activation or warning state, as shown in FIG. 2C.

FIG. 2C, continuing from FIG. 2B, shows the user 14 with a hand on the weapon 16, and withdrawing or beginning to withdraw the weapon 16 from the holster 30. The partially withdrawn weapon 16 is shown with the indicator 81 or the second indicator 84 showing a yellow light indicating warning for danger or system activation, and activation signal having been sent and the pre-determined amount of time beginning to run, as indicated by reference number 90. The user 14 is also shown wearing a bracelet 88, the bracelet 88 comprising an indicator 81 or second indicator 84, which can be emitting yellow light with, or instead of, the second indicator 84 shown as part of the indicator panel 80 on the holster 30.

FIG. 2D, continuing from FIG. 2C, shows the user 14 with a hand on the weapon 16, and the weapon 16 completely drawn or withdrawn from the holster 30. The withdrawn weapon 16 is shown with the indicator 81 or the third indicator 86 showing a red light indicating an emergency or system activation, and emergency signal having been sent the PSAP 20, the pre-determined amount of time 90 having elapsed, or a gunshot having been detected. The user 14 is also shown wearing a ring 87, the ring 87 comprising an indicator 81 or third indicator 86, which can be emitting red light with, or instead of, the third indicator 86 shown as part of the indicator panel 80 on the holster 30. To prevent the emergency signal, notification of the PSAP 20, and moving from the second indicator 84 being activated to the third indicator 86 being activated, the user may also toggle the activation switch 110 from an alarm mode 112 or a neutral position to a non-alarm mode 114.

Figure 3A:
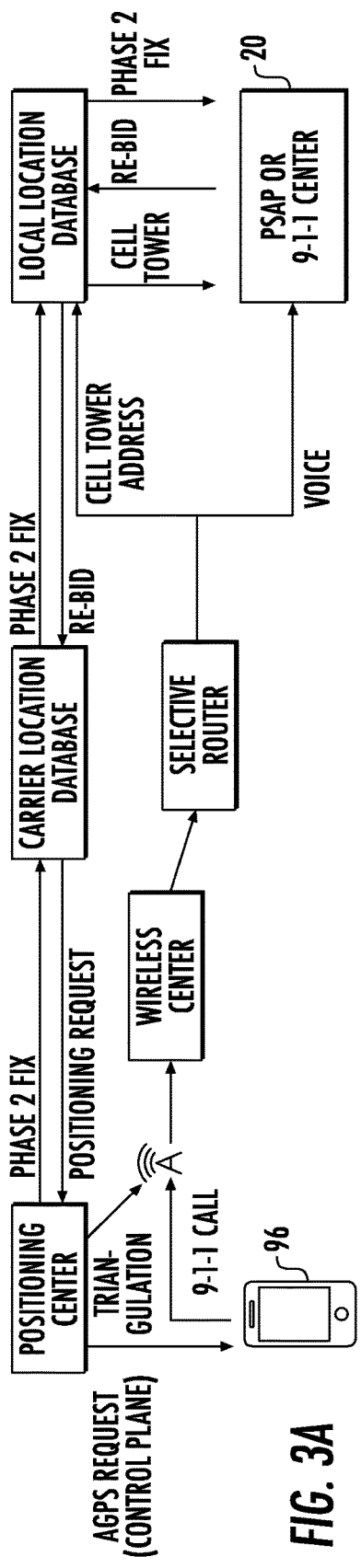
FIGS. 3A and 3B depict flows of communication with PSAPs.
Figure 3B:
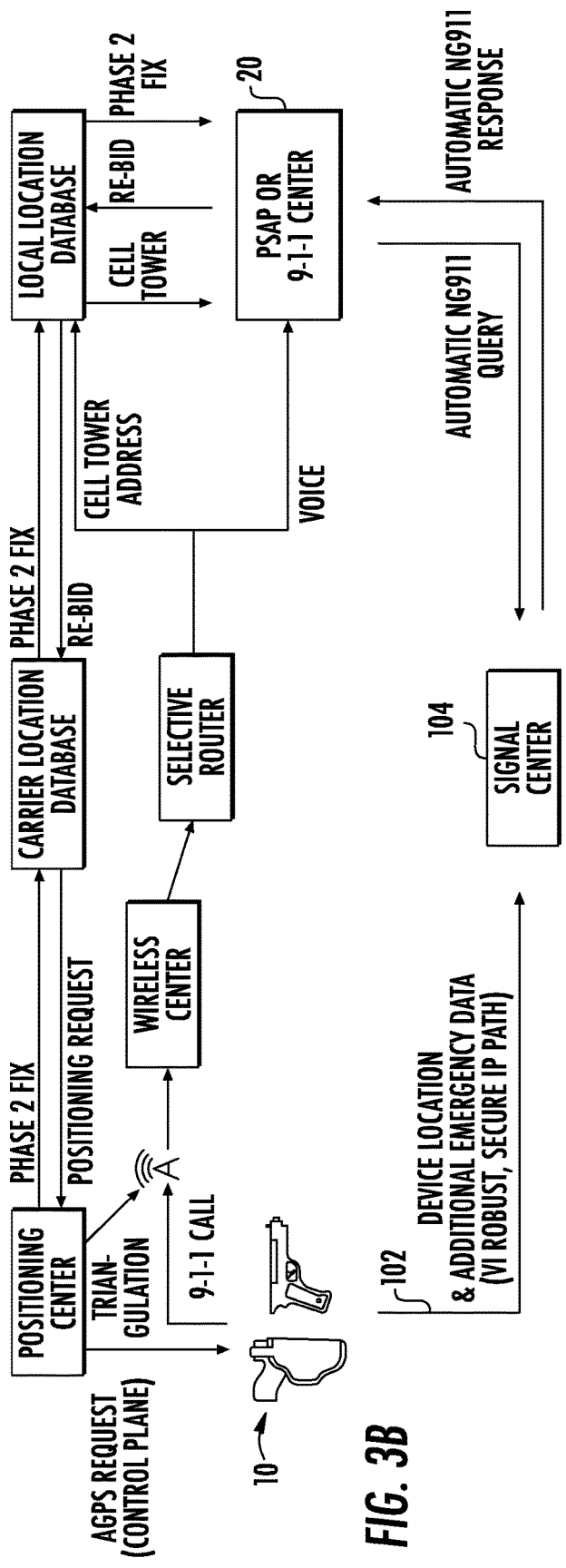

FIGS. 3A and 3B show flow charts of how communications are routed to PSAPs, where FIG. 3A shows a conventional route or flow and FIG. 3B shows an expedited rout or flow. FIG. 3A depicts conventional process for receiving and handling an emergency call at PSAP. At the time of the preparation of the present application, there are approximately 6,300 primary 911 call centers or PSAPs in the US, with numerous small PSAPs serving rural areas or areas of low population density. When a call is placed such as by mobile device or cell phone 96, the call is being handled by a PSAP that has lots of protocol, and is handling the signal transmission based, in many cases, on infrastructure that was built in the 1960s. As shown in FIG. 3A, a call will go through a wireless carrier and a selective router to the PSAP, after which, in order for a location to be determined, a Phase 2 Fix will be determined by working through a local location database and a carrier location data base to triangulate a call position using cell towers through a positioning center, and then returning the position information to the PSAP. The Phase 2 Fix provides about 50% accuracy within 50 meters of caller location and requires about 30 seconds when everything works. Sometimes the rebid doesn't work, location isn't determined. If the Phase 2 Fix doesn't work for obtaining an location, the PSAP may reach out to a cell carrier directly and obtain caller location based on a service provider pin, which typically takes about 15-20 minutes.

FIG. 3B shows an improved system in which the smart holster system 10, through transmitter 100 and reaching out to PSAP 20 through a signal center 104, can get GPS location information to the PSAP with 15 meters of accuracy in 3-5 seconds with live updates every 3-5 seconds. The signal center 104 may be a new signal center or existing telematics company or service provider like OnStar, RapidSOS, Vesta or VESTA 9-1-1 systems, GeoLynx or GeoComm GeoLynx Server, Solacom or Solacom Guardian 9-1-1, Zetron or Zetron Max Cal-Taking, Tritech, or any similar or suitable intermediary or direct connection to the PSAP.

The signal center 104 can see the data transmitted from the smart holster system 10, confirm the data, and place a call to the PSAP 20 without dialing 9-1-1 and without dialing 10 digit number because of relationship with the PSAP or emergency center. The signal center 104 has integration with the PSAP, has a user interface (UI) and access tied directly to the PSAP. Because the signal center UI with the PSAP is supplemental data, it is not taxed with the regulatory burden of compliance with copious rule, and may be integrated with the PSAP Computer Automated Dispatch (CAD) system, improving communication delivery, bypassing old infrastructure, and relieving the user 14 the additional burden of calls, communication, and other steps that are seamlessly integrated with the smart holster system 10.

The signal center 104 may have one-way direction for data sending, and may also limit the availability of data from the smart holster system 10 to the PSAP 20 for a limited amount of time, such as for only 5-120 minutes, or 5-60 minutes, or 5-30 minutes, or 10 minutes. In some instances, availability of data from the signal center 104 to the PSAP 20 could vary based on location and anticipated response time. The data could be purged after a set amount of time absent any emergency event or user approved need to preserve data. A set amount of time until data is purge could be 3-72 hours, 6-48 hours, 24 hours, 12 hours, or any suitable amount of time thereabout.

As discussed above, the smart holster system 10 may be placed into an activated mode, where the status (drawn or holstered) of weapon 16 is being monitored. This is similar to arming a home security system. The smart holster system 10 may provide outward indications that the smart holster system has been triggered and that notifications have been made and recording begun, such as through the indicator panel 80. Such an indication may include, but is not limited to, a sound, a light, a vibration, an alarm or recording being played, and the like.

An exemplary but non-limiting use case follows. The user 14 is carrying the weapon 16 legally in an activated smart holster 30 and is in fear for their life and has to draw or fire their weapon 16. The moment the smart holster system 10 determines the weapon 16 has been drawn, a timer starts to count down until the predetermined amount of time 90 is reached and the system 10 is triggered and the authorities or PSAP 20 are contacted. Alternatively, the system 10 may be activated after a shot is fired. The police are notified and are on their way. The entire harrowing event is captured on audio and video by the recording system 40.

Subsequent determinations of whether the drawing of the weapon 16 or the use of deadly force was justified will include evidence based upon recorded audio and video from the recording system 40, rather than merely on the believability of the recollection of witnesses, helping to ensure that the guilty are brought to justice and the innocent are protected. Investigators may be enabled to create a proper timeline of events, providing proof of proper defensive weapon use.

While a number of embodiments have been described; a person of ordinary skill in the art will understand that various modifications may be made. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in one or more of a machine-readable medium or a machine accessible medium compatible with a data processing system (e.g., a computer system), or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and drawings may be regarded in an illustrative rather than a restrictive sense.

Where the above examples, embodiments and implementations reference examples, it should be understood by those of ordinary skill in the art that other holster devices and servers could be intermixed or substituted with those provided. In places where the description above refers to particular embodiments of smart holster monitoring systems and methods, it should be readily apparent that a number of modifications may be made without departing from the spirit thereof and that these embodiments and implementations may be applied to other smart holster systems as well. Accordingly, the disclosed subject matter is intended to embrace all such alterations, modifications and variations that fall within the spirit and scope of the disclosure and the knowledge of one of ordinary skill in the art.

What is claimed is:

1. A smart holster system configured to provide notifications of weapon danger, the system comprising:
   a holster body configured to receive a weapon;
   a processor coupled to the holster body, the processor configured to receive, process, and send signals;
   a magnetic sensor coupled to the holster body, the magnetic sensor configured to detect removal of the weapon from the smart holster and send a first signal to the processor indicating the weapon has been drawn from the smart holster;
   a decibel meter coupled to the holster body, the decibel meter configured to detect a gunshot when sound at an intensity greater than or equal to 120 decibels is detected and to send a second signal to the processor indicating the gunshot has been detected;
   a recording device coupled to the holster body and configured to record video, audio, or both, in response to an activation signal from the processor, the processor sending the activation signal to the recording device after a predetermined amount of time elapses from the processor receiving the first signal or after the processor receives the second signal;
   a solid-state memory system coupled to the recording device and configured to store recordings from the recording device;
   an indicator panel coupled to the holster body and comprising a first indicator configured as a green light, a second indicator configured as a yellow light, and a third indicator configured as a red light, wherein:
     the first indicator is configured to be activated and the green light to be on until the indicator panel receives an activation signal from the processor or an emergency signal from the processor,
     the second indicator is configured to be activated and the yellow light to be on after the indicator panel receives an activation signal from the processor and until the indicator panel receives an emergency signal from the processor, and
     the third indicator is configured to be activated and the red light to be on after the indicator panel receives an emergency signal from the processor or a predetermined amount of time elapses;
   a transmitter coupled to the holster body and configured to notify a Public Safety Access Point (PSAP) without manually entering a 10-digit phone number in response to receiving an emergency signal from the processor, the processor being configured to send the emergency signal to the transmitter:
 after the predetermined amount of time from receiving the first signal from the magnetic sensor, or
 after receiving the second signal from the decibel meter; and
an activation switch coupled to the holster body and movable to an alarm mode and a non-alarm mode, wherein:
 upon being moved to the alarm mode the activation switch is configured to send a third signal to the processor indicating an emergency, and the processor after receipt of the third signal is configured to send the emergency signal to the third indicator and the emergency signal to the transmitter, and
 upon being moved to the non-alarm mode the activation switch is configured to send a fourth signal to the processor indicating a false alarm, and the processor after receipt of the fourth signal is configured to send a non-emergency signal to the indicator panel to turn off the yellow light and turn on the green light and to send a non-emergency signal to the transmitter to prevent the transmitter from notifying the PSAP.

2. The smart holster system of claim 1, wherein the holster body comprises a level three weapon retention system.

3. The smart holster system of claim 1, wherein the weapon comprises a sidearm, pistol, or firearm.

4. The smart holster system of claim 1, wherein the predetermined amount of time comprises 10 seconds or less.

5. The smart holster system of claim 1, wherein the sensor detecting the weapon being drawn can detect the weapon being partially and not completely drawn.

6. The smart holster system of claim 1, wherein the transmitter comprises one or more of a wireless modem, a global positioning system (GPS) transmitter, a Bluetooth transmitter, a RFID or radio transmitter, and an induction loop transmitter.

7. A smart holster system configured to provide notifications of weapon danger, the system comprising:
a holster body configured to receive a weapon;
a processor coupled to the holster body, the processor configured to receive, process, and send signals;
a first sensor coupled to the holster body, the first sensor configured to detect removal of the weapon from the smart holster and send a first signal to the processor indicating the weapon has been drawn from the smart holster;
a second sensor coupled to the holster body, the second sensor configured to detect a gunshot and to send a second signal to the processor indicating the gunshot has been detected;
a recording device coupled to the holster body and configured to record video, audio, or both, in response to an activation signal from the processor, the processor sending the activation signal to the recording device after a predetermined amount of time elapses from the processor receiving the first signal or after the processor receives the second signal;
an indicator panel comprising:
 a first indicator configured to be activated until the weapon has been drawn or the gunshot has been detected,
 a second indicator is configured to be activated after the weapon has been drawn and until the gunshot has been detected or a predetermined amount of time elapses, and
 a third indicator is configured to be activated after the gunshot has been detected or the predetermined amount of time has elapsed; and
a transmitter coupled to the holster body and configured to notify a Public Safety Access Point (PSAP) without entering a phone number in response to the third indicator being activated.

8. The smart holster system of claim 7, further comprising an activation switch movable to an alarm mode and a non-alarm mode, wherein:
upon being moved to the alarm mode the activation switch is configured to send a third signal to the processor indicating an emergency, and the processor after receipt of the third signal is configured to send the emergency signal to the third indicator and the emergency signal to the transmitter; and
upon being moved to the non-alarm mode the activation switch is configured to send a fourth signal to the processor indicating a false alarm, and the processor after receipt of the fourth signal is configured to send a non-emergency signal to the indicator panel to turn off the second indicator and turn on the first indicator and to send a non-emergency signal to the transmitter to prevent the transmitter from notifying a PSAP.

9. The smart holster system of claim 7, wherein the holster body comprises a level three weapon retention system.

10. The smart holster system of claim 7, wherein the weapon comprises a sidearm, pistol, or firearm.

11. The smart holster system of claim 7, wherein the predetermined amount of time comprises 10 seconds or less.

12. The smart holster system of claim 7, wherein the sensor detecting the weapon being drawn can detect the weapon being partially and not completely drawn.

13. The smart holster system of claim 7, wherein the transmitter comprises one or more of a wireless modem, a global positioning system (GPS) transmitter, a Bluetooth transmitter, a RFID or radio transmitter, and an induction loop transmitter.

14. A smart holster system configured to provide notifications of weapon danger, the system comprising:
a holster body configured to receive a weapon;
a first sensor coupled to the holster body, the first sensor configured to detect removal of the weapon from the smart holster and send a first signal indicating the weapon has been drawn from the smart holster;
a second sensor coupled to the holster body, the second sensor configured to detect a predetermined audio signature and to send a second signal indicating the predetermined audio signature has been detected;
an indicator panel comprising:
 a first indicator configured to be activated until the weapon has been drawn or the predetermined audio signature has been detected,
 a second indicator configured to be activated after the weapon has been drawn and until the predetermined audio signature is detected or a predetermined amount of time elapses, and
 a third indicator configured to be activated after the predetermined audio signature is detected or the predetermined amount of time elapses after the weapon has been drawn; and a transmitter configured to notify a Public Safety Access Point (PSAP) without entering a phone number in response to the third indicator being activated.

15. The smart holster system of claim 14, wherein the predetermined amount of time comprises 10 seconds or less.

16. The smart holster system of claim 14, wherein the weapon comprises a sidearm, pistol, firearm, taser, aerosol spray container, knife, club, or night stick.

17. The smart holster system of claim 14, further comprising a recording device configured to record video, audio, or both, in response to the second indicator being activated.

18. The smart holster system of claim 14, wherein the sensor detecting the weapon being drawn can detect the weapon being partially and not completely drawn.

19. The smart holster system of claim 14, wherein the transmitter comprises one or more of a wireless modem, a global positioning system (GPS) transmitter, a Bluetooth transmitter, a RFID or radio transmitter, and an induction loop transmitter.

20. The smart holster system of claim 14, further comprising an activation switch movable to an alarm mode and a non-alarm mode, wherein:
  upon being moved to the alarm mode the third indicator is activated; and
  upon being moved to the non-alarm mode the first indicator is activated and the transmitter will not notify a PSAP based on a preceding event.

* * * * *